(12) United States Patent
Lempkowski et al.

(10) Patent No.: US 6,963,680 B2
(45) Date of Patent: Nov. 8, 2005

(54) OPTICAL COMMUNICATION DEVICE FOR ROTARY MOTION ASSEMBLIES

(75) Inventors: Robert Lempkowski, Elk Grove, IL (US); Tomasz L. Klosowiak, Glenview, CA (US); Huinan Yu, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 89 days.

(21) Appl. No.: 10/431,735

(22) Filed: May 8, 2003

(65) Prior Publication Data

US 2004/0223689 A1    Nov. 11, 2004

(51) Int. Cl.$^7$ ................................................ G02B 6/26
(52) U.S. Cl. .......................................... 385/26; 385/33
(58) Field of Search ............................ 385/26, 33, 50, 385/53, 88, 93, 134–137, 147

(56) References Cited

U.S. PATENT DOCUMENTS

| | | | |
|---|---|---|---|
| 4,822,136 A * | 4/1989 | Hicks, Jr. .................... | 385/142 |
| 5,111,571 A * | 5/1992 | Ciboldi et al. ........... | 29/407.07 |
| 6,389,194 B1 | 5/2002 | Passman | |
| 2003/0063863 A1 * | 4/2003 | Nardelli et al. ................ | 385/53 |
| 2003/0087610 A1 * | 5/2003 | Ono ............................ | 455/90 |
| 2003/0147257 A1 * | 8/2003 | Lee .............................. | 362/561 |

* cited by examiner

*Primary Examiner*—Sarah Song

(57) ABSTRACT

An optical communication between a first and second body portion connected by a rotatable member is established. A first optical fiber is attached to the first body portion and a second optical fiber is attached to the second body portion in a manner to allow the first and second optical fibers to be co-aligned with each other and with the rotatable member axis of rotation within the rotatable member. An optical signal emitted from a source on an input circuit board on the first body will transfer through the first optical fiber and be transmitted from the first fiber to the second optical fiber while concentrically aligned within the rotatable member, establishing optical communication between the source on the first body portion and a display device on the second body portion.

14 Claims, 5 Drawing Sheets

OPTICAL COMMUNICATION DEVICE FOR ROTARY MOTION ASSEMBLIES

FIELD OF THE INVENTION

This invention relates generally to the optical transfer of data from an input device through a rotatable member to a receiving device. More specifically, the present invention relates to the use of optical fiber as the coupling medium.

BACKGROUND OF THE INVENTION

There is a need for medium capacity, data communication within a cell phone, lap top computer or any other like device via a rotatable member or hinge. Typically, a rotary member provides a flip opening between the input device section, which has a keyboard, and the receiving section, which houses a display. It is preferable that the data transfer between the sections be reliable, stable and immune from noise. The components comprising the input and receiving devices are typically emitting electromagnetic waves and may be receiving or emitting radio waves, thus the coupling connector is preferably immune to electromagnetic interference (EMI) and radio frequency interference (RFI) to prevent EMI and RFI noise in the data transfer. All electrical connectors are sensitive to EMI and RFI.

There are various known connectors including flexible strip connections or solid metal wire connections. These types of electrical communication are prone to fatigue and wear. A rotary RF connection has size and efficiency issues. A rotary transformer, another connector option, is large, has throughput limitations.

It is desirable to have a communicating device, which allows limited or unlimited range of motion of the connected devices. Such a communicating device is preferably small, lightweight, immune to wear and fatigue from rotational cycles, with no introduction of noise or error, for any angle between the input and receiving devices and also during rotation of the input and receiving devices about the attaching rotatable member.

SUMMARY OF THE INVENTION

One form of the present invention is a device comprising a first body portion, attached to a second body portion by a rotatable member, which has an axis of rotation. A first optical fiber is secured to the first body and a second optical fiber is secured to the second body while the unsecured ends are aligned within the rotatable member. The optical axis of the optical fibers and the axis of the rotation are all aligned along the same axis. There is a space between the aligned optical fiber ends, through which optical power is transferred, effecting optical communication between the first and second body portions.

An optical signal emitted from a first light source is transferred along the first optical fiber and transmitted through the space to be received by the second optical fiber at least partially in concentric alignment with the axis of rotation of the rotatable member.

The forgoing device and other devices as well as features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

The present invention is illustrated by way of example and not limitation in the accompanying figures, in which like references indicate similar elements, and in which.

DETAILED DESCRIPTION OF THE PRESENTLY PREFERRED EMBODIMENTS

Figure 1:
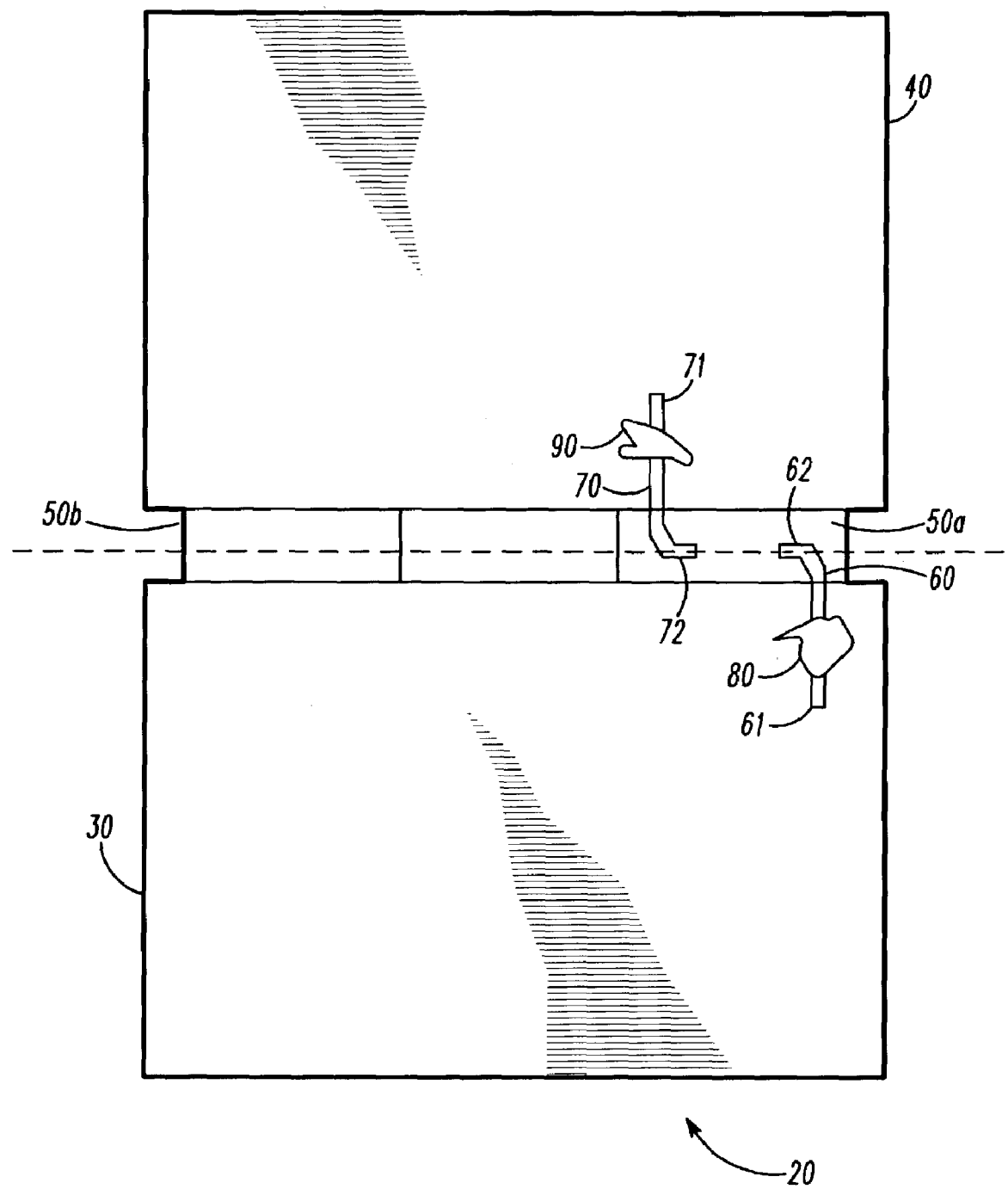
FIG. 1 illustrates schematically, in a top view, a first embodiment of the optical communicating device with the communicating body portions at a relative angle of 180 degrees.

FIG. 1 illustrates a device 20, such as a laptop computer or a mobile telephone, where a first body portion 30 and a second body portion 40 are attached at rotatable members 50a and 50b, which have a common rotational axis, indicated by a dashed line. The first body portion 30 and the second body portion 40 have an angle less than 180 degrees between them, which is an open and operational position of a laptop computer or mobile phone. A first optical fiber 60 is operably attached, using, for example, adhesive 80, near the first end 61 of the optical fiber 60 to the first body portion 30. A second optical fiber 70 is operably attached, in an example, using adhesive 90, near the first end 71 of the optical fiber 70 to the second body portion 40. The second end 62 of the first optical fiber 60, and the second end 72 of the first optical fiber 70 are positioned within the rotatable member 50a, so that the optical axis of the second ends 62, 72 of the first and second optical fibers 60, 70 are aligned along the rotational axis of the rotatable member 50a. A space is left in between the second end 62 of the first optical fiber 60 and the second end 72 of the second optical fiber 70. Light propagating in first optical fiber 60 will be emitted into the space between the second fiber ends 62 and 72. Depending on the fiber core diameters (not shown) and the distance between the second end 62 of the first optical fiber 60 and the second end 72 of the second optical fiber 70, a portion of the light will be coupled into the second optical fiber 70 bringing the first optical fiber 60 and the second optical fiber 70 into optical communication.

Figure 2:
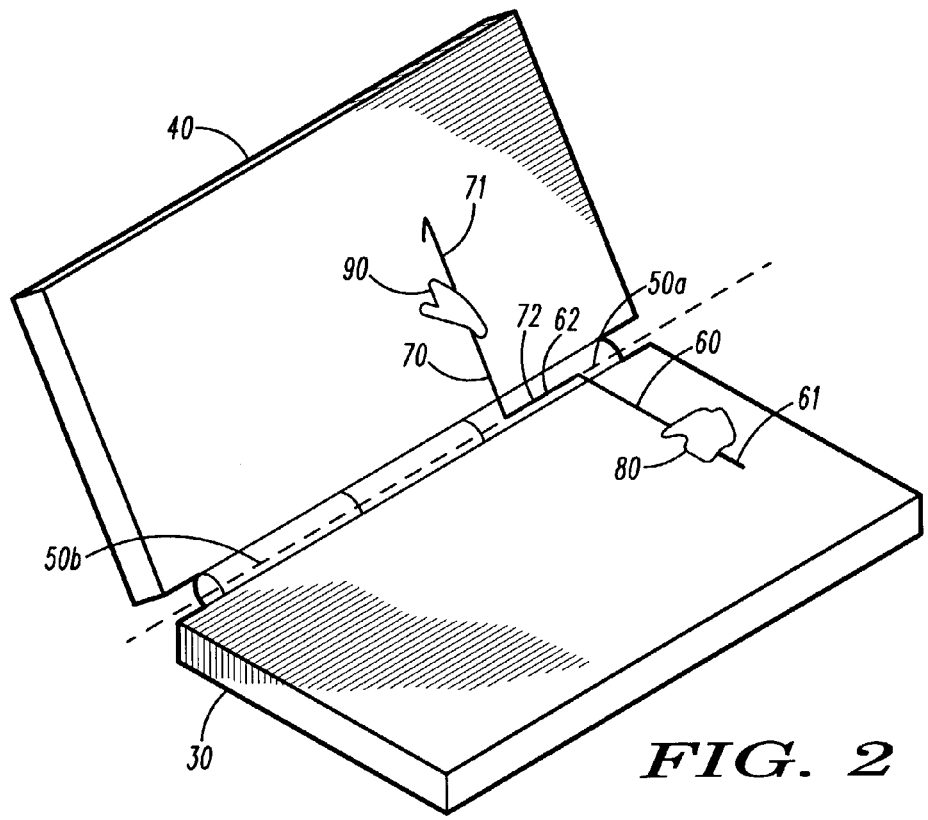
FIG. 2 illustrates schematically, in an oblique view, the first embodiment of the optical communicating device with the communicating body portions at a relative angle greater than 90 degrees and less than 180 degrees.

FIG. 2 illustrates the device 20, from an oblique angle, where the angle between the first body portion 30 and the second body portion 40 is approximately 110 degrees. The optical axis of the second end 62 of the first optical fiber 60 and the optical axis of the second end 72 of the second optical fiber 70 are still aligned to the rotational axis of the rotatable member 50a, indicated by the dashed line. This alignment is maintained upon rotation of the first body portion 30 and the second body portion 40 and is maintained for any set angle between the first body portion 30 and the second body portion 40. Thus, optical communication between first optical fiber 60 and second optical fiber 70 is constantly maintained, when an optical signal is propagating in first optical fiber 60.

Figure 3:
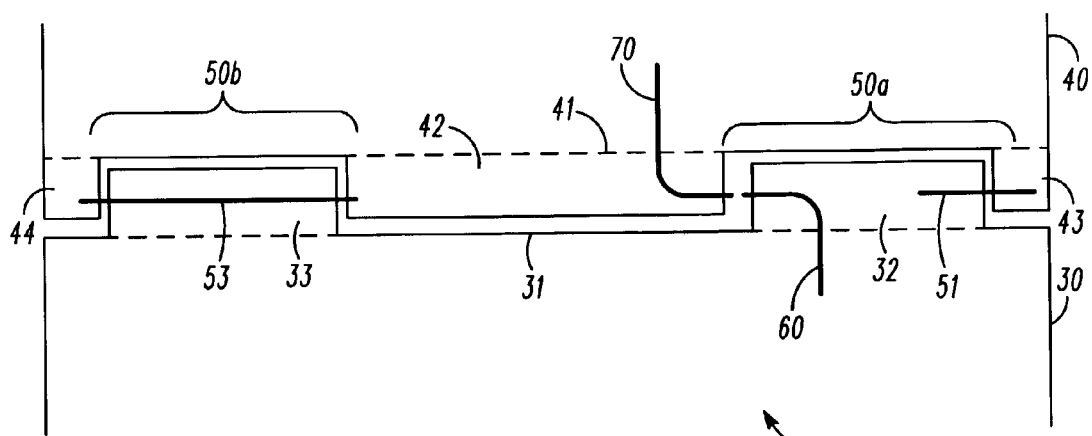
FIG. 3 illustrates schematically, in a top view, the optical communicating device of FIG. 1.

FIG. 3 illustrates the same configuration as in FIG. 1 with more detail of the first body portion 30, the second body portion 40 and how they form the rotatable members 50a and 50b to effect optical coupling between the first fiber 60 and the second fiber 70 for any angle and upon rotation. An edge 31 of the first body portion 30 to which the rotatable members 50a and 50b are connected is indicated by a line, including the dashed lines, separating the first body member from extending tabs 32 and 33. An edge 41 of the second body portion 40 to which the rotatable members 50a and 50b are connected is indicated by the solid lines on rotatable members 50a and 50b and by dashed lines separating the second body member 40 from extending tabs 42, 43 and 44. The rotatable members 50a is formed by fitting extending tab 32 of the first body portion 30, between extending tabs 42 and 43 of second body portion 40. Pin 51 positioned along the axis of rotation of rotatable member 50a holds the first and second body portions 30, 40 in position at the interface of extending tab 32 of the first body portion 30 and extending tab 43 of the second body portion 40. At the interface of extending tab 32 of the first body portion 30 and extending tab 42 of the second body portion 40, the optical fibers 60 and 70 are aligned along the axis of rotation of rotatable member 50a. Likewise, extending tab 33 of the first body portion 30 fits between extending tabs 42 and 44 of second body portion 40 forming a second rotatable member 50b. The pin 53 along the axis of rotation of rotatable member 50b holds the first and second body portions 30, 40 at the interfaces of extending tab 33 of the first body portion 30 with extending tabs 42 and 44 of second body portion 40. The rotatable member 50a and rotatable member 50b share the same optical axis.

The pins 51 and 53 at the interfaces of the rotatable members 50a and 50b provide the required stability and ease of motion during rotation of first body portion 30 with respect to second body portion 40. The first and second optical fibers 60, 70 do not provide stability to the rotation of device 20, but rather, provide optical communication between first and second body portions 30 and 40. The device 20 can have a single rotatable member or more than the two illustrated rotatable members 50a and 50b, which may be desirable, if the first and second body portions 30 and 40 are so large or heavy that pins 51 and 53 do not provide the required stability.

Figure 4:
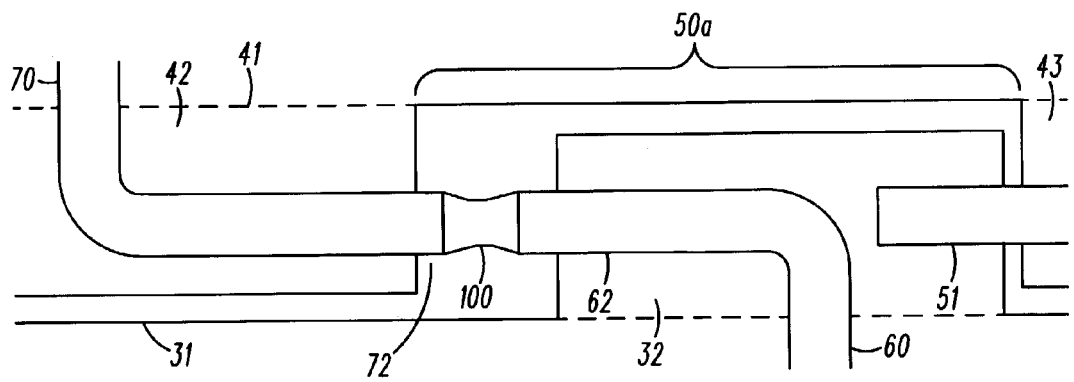
FIG. 4 illustrates schematically, in a top expanded view, a second embodiment of the optical communicating device.

FIG. 4 illustrates a second embodiment of the interface between the first optical fiber 60 and the second optical fiber 70 at the rotatable member 50a. The space between the second end 62 of the first optical fiber 60 and the second end 72 of the second optical fiber 70 is filled with a fluid, such as index matching fluid, to form a fluidic waveguide 100 for any light transmitted from the first optical fiber 60. This simple fluidic waveguide 100 will increase the amount of light coupled from the first optical fiber 60 to the second optical fiber 70. The fluidic waveguide 100 will not impede the rotation of the first body portion 30 or the second body portion 40 and the increased optical coupling will be maintained upon rotation and for any set angle. Likewise, a soft gel material could be placed in the space between the second end 62 of the first optical fiber 60 and the second end 72 of the second optical fiber 70, for the same improved coupling effect.

Figure 5:
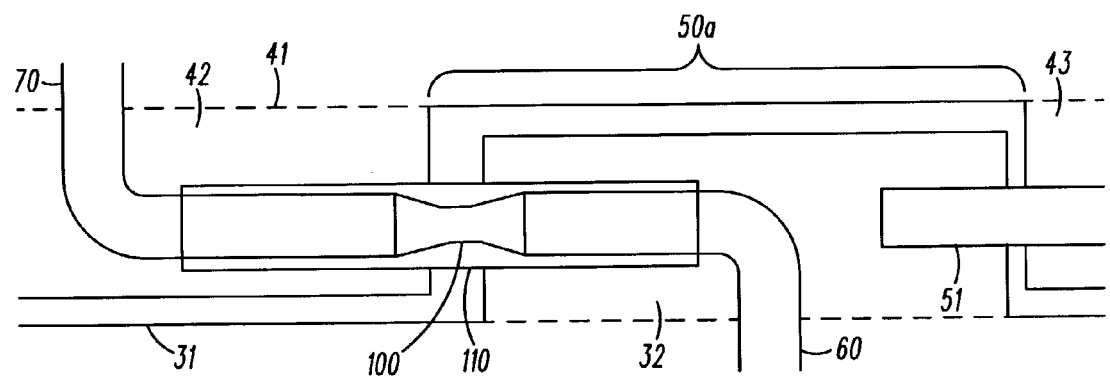
FIG. 5 illustrates schematically, in a top expanded view, a third embodiment of the optical communicating device.
Figure 6:
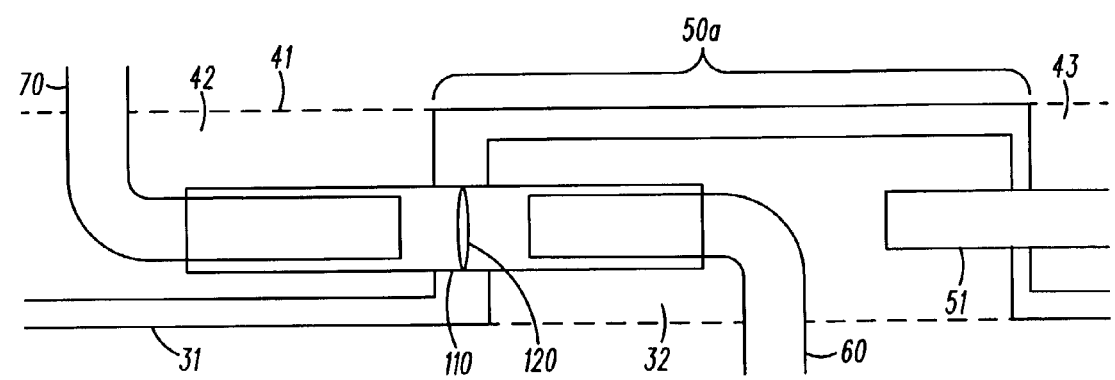
FIG. 6 illustrates schematically, in a top expanded view, a fourth embodiment of the optical communicating device.

FIG. 5 illustrates a third embodiment of device 20. In this embodiment tube 110 is concentrically aligned to the axis of rotation of rotatable member 50a. Preferably, the tube 110 inner diameter is slightly larger than the diameter of the optical fiber, so the fibers 60, 70 are held in alignment with the axis of rotation of rotatable member 50a. This tube 110 may provide additional stability between extending tab 42 and extending tab 32. As in FIG. 4, the space between the second end 62 of the first optical fiber 60 and the second end 72 of the second optical fiber 70 is filled with a fluid, such as index matching fluid, to form a fluidic waveguide 100. FIG. 6 illustrates a fourth embodiment in which a lens 120 with a diameter slightly less than the inner diameter of the tube 110 is fixed inside the tube 110. The optical axis of the lens 120 is positioned in alignment with the optical axis of first optical fiber 60 and second optical fiber 70 and with the axis of rotation of the rotatable member 50a. The lens 120 will accept the light transmitted from the first optical fiber 60 and focus it onto second optical fiber 70. The first and second optical fibers 60 and 70 are positioned on either side of lens 120 at the correct distance to maximize the coupling efficiency or optical throughput to second optical fiber 70. Since the lens 120 shares an optical axis with the first and second optical fibers 60 and 70 and with the rotational member 50a the coupling of light from first optical fiber 60 to second optical fiber 70 will be maintained upon rotation and for any set angle between body portions 30 and 40.

Figure 7:
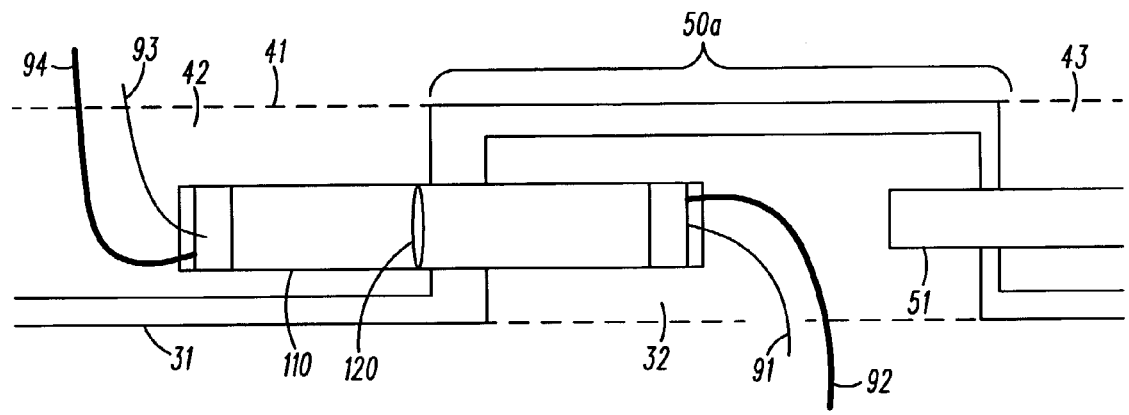
FIG. 7 illustrates schematically, in a top expanded view, a fifth embodiment of the optical communicating device.

An alternate embodiment of the optical communicating device 21 illustrated in FIG. 7 does not require the first and second optical fibers 60 and 70, but places an optical power source 91 with the emitted light aligned to the axis of rotation of rotatable member 50a on the first body portion 30 and an optical detector 93, aligned to the axis of rotation of rotatable member 50a, on the second body portion 40 so that the light from the optical power source 91 is coupled into the optical detector 93. Optical power source 91 is connected by trace line 92 to the driving electronics (not shown) and optical detector 93 is connected by trace line 93 to the receiver electronics (not shown). As illustrated in FIG. 7 tube 110 is holding the optical power source 91 and the optical detector 93 in alignment with lens 120 to enhance the coupling efficiency, though neither the tube 110 nor lens 120 are required. The optical power source may be a laser or light emitting diode (LED).

Additionally, the optical communicating device can be designed with an intentional lateral offset, by a known and fixed amount, of the first optical fiber 60 and the second fiber 70 from the axis of rotation. The optical axis of the first optical fiber 60 and second fiber 70 are still parallel to the axis of rotation, but not concentric with the axis of rotation. Only when the second body part 40 is rotated away from the first body part 30 by a fixed angular amount, to a desired open position, are the first optical fiber 60 and the second optical fiber 70 aligned to permit optical communication between the first body part 30 and the second body part 40. This embodiment of an optical communicating device can be part of an optical communicating device with a rotation controlled on/off switch.

Figure 8:
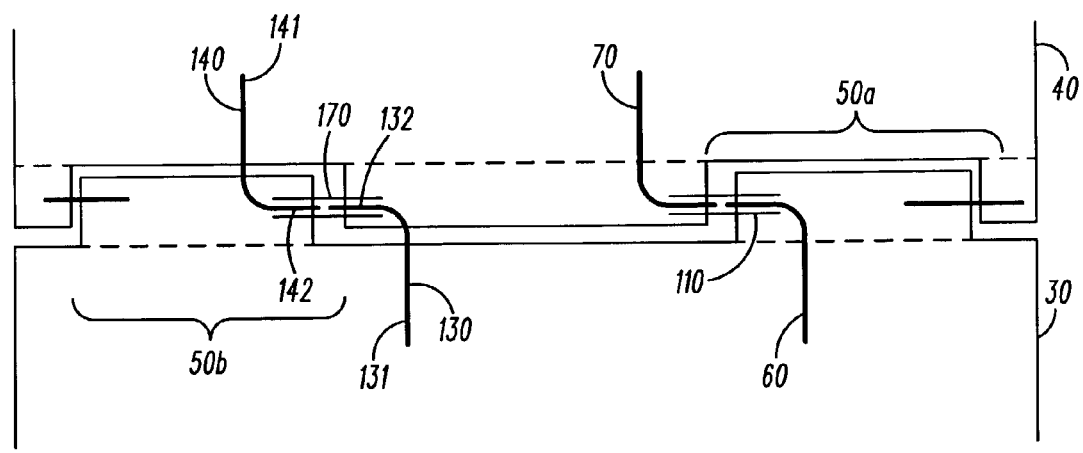
FIG. 8 illustrates schematically, in a top view, a sixth embodiment of the optical communicating device.

FIG. 8 illustrates a fifth embodiment in which more than one communicating fiber pair is used. Here the second rotatable member 50b is used to communicate an optical beam (not shown) from the first body portion 30 to the second body portion 40 in the same manner in which the rotatable member 50a was used. In this case, a third optical fiber 130 is attached by some means, such as adhesive (not shown), near the first end 131 to the first body portion 30 and a fourth optical fiber 140 is attached by some means, such as adhesive (not shown), near the first end 141 to the second body portion 40. The second end 132 of the third optical fiber 130, and the second end 142 of the fourth optical fiber 140 are positioned within the rotatable member 50*b*, so that the optical axis of the second ends 132, 142 of the third and fourth optical fibers 130, 140 are aligned along the rotational axis of the rotatable member 50*b*. A space is left in between the second end 132 of the third optical fiber 130 and the second end 142 of the fourth optical fiber 140. The second fiber ends 132 and 142 are, in one embodiment, held within a tube 170, which is concentrically aligned with the rotational axis of the rotatable member 50*b* and which preferably has an inner diameter slightly larger than the diameter of the third and fourth optical fibers 130, 140. Light propagating in third optical fiber 130 will be emitted into the space between second fiber ends 132 and 142. Depending on the fiber core diameters (not shown) and the distance between the second end 132 of the third optical fiber 130 and the second end 142 of the fourth optical fiber 140, a portion of the light will then be coupled into the fourth optical fiber 140 bringing the third optical fiber 130 and the fourth optical fiber 140 into optical communication. If the device 20 has a plurality of rotatable members, then, in like manner, a plurality of fiber pairs can be in optical communication from the first body portion 30 and second body portion 40.

If the optical communication device 20 requires feedback from the second body portion 40 to the first body portion 30, the embodiment illustrated in FIG. 8 can be used to transfer the optical signal in the opposite direction. In that case, the fourth optical fiber 140 can receive a signal from second body portion 40 and transmit the signal through rotational member 50*b* to third optical fiber 130. Third optical fiber 130 can then transfer the signal to a receiving circuit (not shown) on first body portion 30. Additionally, one fiber pair, for example 60–70, can be configured for bi-directional transmission to allow simultaneous initial communication and feedback, by including an optical power source and detector on each of the body portions 30 and 40 with appropriate passive couplers, as is known to those of ordinary skill in the art.

Figure 9:
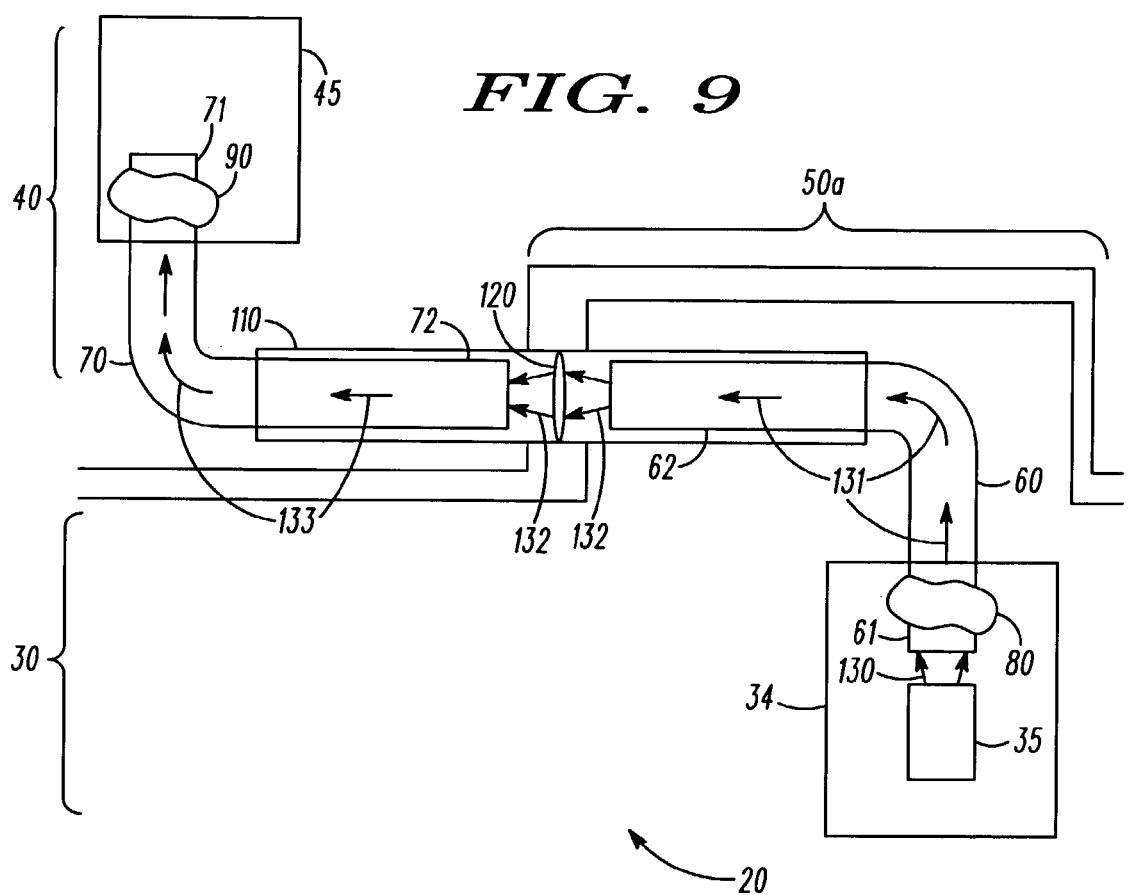
FIG. 9 illustrates schematically, in a top expanded view, the optical communicating device of FIG. 6 in operation.

FIG. 9 illustrates the operation of the fourth embodiment, illustrated in FIG. 6, of device 20. An input circuit board 34, attached to the first body portion 30 accepts the input data, which drives the light emitting diode (LED) 35, which is attached to the input circuit board 34. An optical beam 130, emitted from the LED 35, is coupled into the first optical fiber 60. The first end 61 of first optical fiber 60 is operably attached to the input circuit board 34, for example, using adhesive 80. The emitted optical beam 130 coupled into first optical fiber 60 propagates as optical beam 131 through the first optical fiber 60. It is output as optical beam 132 where it is incident on the lens 120. The lens 120 focuses the optical beam 132 onto the second end 72 of second optical fiber 70 to couple optical beam 132 into second optical fiber 70. The coupled light propagates as optical beam 133 in the second optical fiber 70. The first end 71 of second optical fiber 70 is operably attached, for example, using adhesive 90, to the receiver circuit board 45. Optical communicating device 20 is preferably used to operate a display, but it not limited to such functionality. The receiver circuit board 45 may be used for any device requiring medium capacity, data communication. Receiver circuit board 45 is attached to the second body portion 40. In an example, the receiver circuit board will receive the optical signal 133 from the second optical fiber 70 and convert it to an electrical signal, which will drive the display located on second body portion 30. The complete operation of transmitting the optical beam 130 from input circuit board 34 to the receiver circuit board 45 is maintained upon rotation of the first body portion 30 with respect to the second body portion 40 and for any fixed angle between the body portions 30 and 40.

The light source 35 is preferably a red LED, since they are inexpensive and capable of being driven at the required data rate for an exemplary device, such as a computer laptop or a cell phone. The optical source 35 can alternately be a laser diode, either an edge emitter or VCSEL or a longer wavelength LED. The means of coupling from a laser or LED into a fiber is known to those of ordinary skill in the art. The optical fibers 60 and 70 can be multimode glass fibers with a core diameter of, for example, 62.5 mm, single mode glass fiber with a core diameter of, for example, 5 mm–10 mm or plastic fibers which can be purchased with a range of relatively large core diameters, in an example, greater than or equal to 90 mm. Since the first and second optical fibers 60 and 70 are short, the loss due to optical attenuation is negligible. The loss from bending the first and second optical fibers 60, 70 to align their optical axis with the rotational axis of the rotating member 50*a* will be less for single mode optical fibers. However, the coupling of single mode optical fibers, through the space between the second ends 62, 72 of the first and second optical fibers 60, 70, without a lens will result in lower coupling efficiency. The larger fiber core in the multimode fibers makes them advantageous for coupling between the first and second optical fibers 60, 70. An optical power budget for a specific device 20 design and specific optical receiver at the receiver circuit board 45 can be done by those of ordinary skill in the art, and can be used to determine the preferred components.

The illustrated embodiments of device 20 (FIG. 1–FIG. 9) are meant to illustrate what can be fabricated for structures configured to transmit optical data from one body portion to another through a rotatable device, such as a hinge, while the body portions are rotated relative to each other. One hinge design is illustrated here, though the communicating device can be used in the many types of hinges. These illustrative embodiments are not intended to be exhaustive of all possibilities or to limit what can be fabricated for the aforementioned purpose. There is, therefore, a multiplicity of other possible combinations and embodiments. By using what is shown and described herein, it is now simpler to transmit optical data through a rotatable member. This device structure allows the use of the optical connection having optical communication through a rotatable member. Light coupled from an optical source to a first optical fiber is transmitted through a rotatable member to a second optical fiber in order to communicate the data input at the first body portion to a second body portion while the body portions are being rotated with respect to each other. This optical communication device is inexpensive, lightweight, robust and immune to radio frequency interference and electromagnetic interference. Those having ordinary skill in the art will therefore appreciate the benefit of employing an embodiment of this optical communication device for numerous devices such as lap top computers, mobile telephones, PDAs, etc. where low cost communication via a rotatable mechanism is desirable.

We claim:
1. A communication device comprising:
a first body portion;
a second body portion attached by a rotatable member to the first body portion, the rotatable member having an axis of rotation;

a first optical fiber operably attached at a first end to the first body portion, a second end of the first optical fiber positioned within the rotatable member and aligned with the axis of rotation;

a second optical fiber operably attached at the first end to the second body portion, a second end of the second optical fiber positioned within the rotatable member and aligned with the axis of rotation, wherein the second end of the first optical fiber is spaced apart from and in optical communication with the second end of the second optical fiber, and a tube concentrically aligned to the axis of rotation of the rotatable member, wherein the tube encloses at least a portion of the second ends of the first and second optical fibers.

2. The device of claim 1, wherein the optical communication between the second end of the first optical fiber and the second end of the second optical fiber is maintained for any relative rotational angle between the first body portion and the second body portion.

3. The device of claim 1, wherein the optical communication between the second end of the first optical fiber and the second end of the second optical fiber is maintained during rotation of the first body portion or second body portion about the axis of rotation.

4. The device of claim 1, wherein a space between the second end of the first optical fiber and second end of the second optical fiber is filled with a fluid.

5. The device of claim 1, further comprising:
a lens held within the tube and having an optical axis aligned with the axis of rotation of the rotatable member.

6. The device of claim 1, wherein the first end of the first optical fiber is operably attached to the first body portion and the second end of the second optical fiber is operably attached to the second body portion.

7. The device of claim 6, wherein adhesive is used to operably attach the first optical fiber to the first body portion and to operably attach the second fiber optical fiber to the second body portion.

8. The device of claim 1, wherein the first body portion comprises an input circuit board and the second body portion comprises a receiver circuit board, wherein the first optical fiber attaches to the input circuit board and the second optical fiber attaches to the receiver circuit board.

9. The device of claim 8, wherein the receiver circuit board comprises a display circuit board operable to drive a display.

10. The device of claim 1, wherein the rotatable member comprises a hinge.

11. The device of claim 1, wherein the first and second optical fibers are selected from the group consisting of multimode plastic fiber, multimode glass fiber, and single mode glass fiber.

12. The device of claim 1, wherein the first and second optical fibers further comprise a plurality of first optical fibers and a plurality of second optical fibers.

13. The device of claim 1, wherein the first body portion further comprises an LED aligned in optical communication with the first end of the first optical fiber.

14. A communication device comprising:
a first body portion;

a second body portion attached by a rotatable member to the first body portion, the rotatable member having an axis of rotation;

an optical power source operably attached to the first body portion within the rotatable member and aligned with the axis of rotation;

an optical detector operably attached to the second body portion within the rotatable member and aligned with the axis of rotation, wherein the optical power source is spaced apart from and in optical communication with the optical detector; and a tube concentrically aligned to the axis of rotation of the rotatable member, wherein the tube encloses at least a portion of the optical power source and the optical detector.

* * * * *